United States Patent
Averbukh et al.

(10) Patent No.: US 10,119,514 B2
(45) Date of Patent: Nov. 6, 2018

(54) ULTRACAPACITOR-BASED POWER SOURCE

(71) Applicant: Ariel-University Research and Development Company Ltd., Ariel (IL)

(72) Inventors: Moshe Averbukh, Beer-Sheva (IL); Alon Kuperman, Ashdod (IL); Simon Lineykin, Beer-Sheva (IL)

(73) Assignee: Ariel—University Research and Development Company Ltd., Ariel (IL)

( * ) Notice: Subject to any disclaimer, the term of this patent is extended or adjusted under 35 U.S.C. 154(b) by 105 days.

(21) Appl. No.: 15/146,988

(22) Filed: May 5, 2016

(65) Prior Publication Data

US 2016/0327007 A1    Nov. 10, 2016

Related U.S. Application Data

(60) Provisional application No. 62/156,953, filed on May 5, 2015.

(51) Int. Cl.
    *H02J 7/00*    (2006.01)
    *F02N 11/08*   (2006.01)
    *H02J 7/34*    (2006.01)

(52) U.S. Cl.
    CPC ........ *F02N 11/0866* (2013.01); *H02J 7/0054* (2013.01); *H02J 7/0068* (2013.01); *H02J 7/345* (2013.01); *F02N 2011/0885* (2013.01); *F02N 2011/0888* (2013.01)

(58) Field of Classification Search
    CPC .................................................. F02N 11/0866
    USPC .................................................. 320/105, 167
    See application file for complete search history.

(56) References Cited

U.S. PATENT DOCUMENTS

| | | |
|---|---|---|
| 6,202,615 B1 | 3/2001 | Pels et al. |
| 6,242,887 B1 | 6/2001 | Burke |
| 6,420,793 B1 | 7/2002 | Gale et al. |
| 6,453,863 B1 | 9/2002 | Pels et al. |
| 6,819,010 B2 | 11/2004 | Burke |
| 6,988,475 B2 | 1/2006 | Burke |
| 7,319,306 B1 | 1/2008 | Rydman et al. |
| 7,573,151 B2 | 8/2009 | Acena et al. |
| 7,806,095 B2 | 10/2010 | Cook et al. |
| 7,872,361 B2 * | 1/2011 | McFadden ............ F02N 1/005 290/1 A |

(Continued)

OTHER PUBLICATIONS

Auer et al. "Ultracapacitor's in Automative: Where and When Ever Power Needed", Journal of Asian Electric Vehicles, 7(1): 1257-1259, Jun. 2009.

(Continued)

*Primary Examiner* — M'Baye Diao

(57) ABSTRACT

An ultracapacitor-based power source includes an ultracapacitor, a charger, output connections and a power source controller. The ultracapacitor-based power source is suitable for backup starting of a starter powered by a starter battery. The charger charges the UC from an energy source. The output connections connect to the starter in parallel with the starter battery. When a start attempt failure occurs, the power source controller connects the UC to the outputs. The connection directs current flow from the UC to the starter, thereby starting the starter from the UC.

25 Claims, 16 Drawing Sheets

(56) References Cited

U.S. PATENT DOCUMENTS

| | | | |
|---|---|---|---|
| 7,963,264 B2* | 6/2011 | Reynolds | F02N 11/0866 123/179.3 |
| 8,134,343 B2 | 3/2012 | Like et al. | |
| 8,179,103 B2 | 5/2012 | Doljack | |
| 8,276,559 B2 | 10/2012 | Holz et al. | |
| 8,544,575 B1* | 10/2013 | Scaringe | B60K 6/485 180/65.21 |
| 2006/0152085 A1* | 7/2006 | Flett | B60L 9/30 307/75 |
| 2014/0288749 A1* | 9/2014 | Dumrongkietiman | B60L 11/005 701/22 |
| 2017/0253231 A1* | 9/2017 | Ciaccio | B60W 20/15 |

OTHER PUBLICATIONS

Averbukh et al. "Portable Ultracapacitor-Based Power Source for Emergency Starting of Internal Combustion Engines", IEEE Transactions on Power Electronics, 30(8): 4283-4290, Aug. 2015.

Baghzouz et al. "Evaluation of a Fuel Cell for Powering the Electrical Load of ICE Vehicles", International Conference on Clean Electrical Power, ICCEP '07, Capri, Italia, May 21-23, 2007, p. 74-77, May 2007.

Catherino et al. "Hybrid Power Supplies: A Capacitor-Assisted Battery", Journal of Power Sources, 162: 965-970, Available Online Aug. 31, 2005.

Chheda et al. "Hybrid Power Pack (Ultra Capacitor + Battery) for Two Wheelers Fitted With Starter Motor", SAE International, Technical Paper, # 2009-26-0077, Jan. 21, 2009.

Fiorenti et al. "Modeling and Experimental Validation of a Hybridized Energy Storage System for Automative Applications", Journal of Power Sources, 241: 112-120, Available Online Apr. 22, 2013.

Hengst et al. "A Small, High-Efficiency Diesel Generator for High-Altitude Use in Antarctica", International Journal of Energy Research, 34: 827-838, Published Online Aug. 18, 2009.

Kertesz et al. "Starter Aiging System Based on Supercapacitors for the LDE2100 Locomotive", 15th International Symposium for Design and Technology of Electronics Packages, SIITME2009, Gyula Hungary, Sep. 17-20, 2009, p. 239-244, Sep. 2009.

Liang et al. "Super Capacitor Assisted Engine Starting System Modeling", Mechanical Engineering & Automation, 4: 014, 2012.

Liu et al. "Improvement on the Cold Cranking Capacity of Commercial Vehicle by Using Supercapacitor and Lead-Acid Battery Hybrid", IEEE Transactions on Vehicle Technology, 58(3): 1097-1105, First Published Aug. 4, 2008.

Maxwell Technologies "Maxwell's Ultracapacitor-Based Engine Start Module", Maxwell Technologies Inc., 2 P., 2015.

Maxwell Technologies "Start / Stop (Micro Hybrid)", Maxwell Technologies Inc., 2 P., 2015.

Miller et al. "Diesel Engine Starting Using Battery-Capacitor Combinations", SAE International, Technical Paper, # 2001-01-2714, Nov. 12, 2001.

Stanca et al. "Embedded System for Start of ICE With Hybrid Battery-Super-Capacitor Sources", 10th International Conference on Development and Application Systems, Suceava, Romania, May 27-29, 2010, 82: 308-313, May 2010.

Stanca et al. "Strategies for Performance Optimization in Supercapacitor-Based ICE Starting Systems", 7th International Conference on Electromechanical and Power Systems, Iasi, Romania, Oct. 8-9, 2009, Annals of the University of Craiova, Electrical Engineering Series, 33: 193-197, Oct. 2009.

Yu et al. "The Feasibility and Superiority of Super-Capacitors on Mild Hybrid Electric Vehicle", Proceedings of the 2009 IEEE International Conference on Mechatronics and Automation, ICMA 2009, Changchun, China, Aug. 9-12, 2009, p. 1347-1351, Aug. 2009.

Yuhimenko et al. "Dynamics of Supercapacitor Bank With Uncontrolled Active Balancer for Engine Starting", Energy Conversion and Management, 88: 106-112, Available Online Sep. 7, 2014.

Zhou et al. "Analysis on Low Temperature Cold Starting Performance of Parallel Hybrid Electric Vehicle With Ultra-Capacitor", Applied Mechanics and Materials, 43: 119-122, Available Online Dec. 6, 2010.

* cited by examiner

ULTRACAPACITOR-BASED POWER SOURCE

RELATED APPLICATION

This application claims the benefit of priority under 35 USC 119(e) of U.S. Provisional Patent Application No. 62/156,953 filed on May 5, 2015, the contents of which are incorporated herein by reference in their entirety.

FIELD AND BACKGROUND OF THE INVENTION

The present invention, in some embodiments thereof, relates to an ultracapacitor-based power source, and, more particularly, but not exclusively, to an ultracapacitor-based power source for emergency starting of an internal combustion engine.

The transportation industry has demonstrated a demand for portable devices which allow emergency starting of internal combustion engines (ICEs) when the vehicle battery is weak. The starting procedure requires an electrical source, capable of providing short yet intensive current burst.

Some emergency start devices are based on lithium-ion battery packs, however they are heavy and expensive and possess a limited lifetime. Other emergency start devices are based on ultracapacitors (UCs) that are mounted in the vehicles and are permanently connected in parallel with the existing batteries. These UC-based devices require bulky current sensors and are not portable.

Additional background art includes:

1. Liu, Hanmin, Zhixin Wang, Jie Cheng, and Doug Maly. "Improvement on the cold cranking capacity of commercial vehicle by using supercapacitor and lead-acid battery hybrid." *Vehicular Technology, IEEE Transactions on* 58, no. 3 (2009): 1097-1105.

2. Catherino, Henry A., Joseph F. Burgel, Peter L. Shi, Andrew Rusek, and Xiulin Zou. "Hybrid power supplies: A capacitor-assisted battery." *Journal of Power Sources* 162, no. 2 (2006): 965-970.

3. M. Averbukh, M. Krinitsky, and B. Rivin, "Development of compact electrical source based on the synergetic partnership between conventional electrochemical storage batteries and ultracapacitors," in Proc. 27th IEEEI Conv., 2012, pp. 1-5.

4. Miller, John R., and Susannah M. Butler. Diesel engine starting using battery-capacitor combinations. No. 2001-01-2714. SAE Technical Paper, 2001.

5. Hengst, Shane, D. M. Luong-Van, J. R. Everett, J. S. Lawrence, M. C. B. Ashley, D. Castel, and J. W. V. Storey. "A small, high-efficiency diesel generator for high altitude use in Antarctica." International Journal of Energy Research 34, no. 9 (2010): 827-838.

6. Baghzouz, Yahia, R. Hurt, and Robert F. Boehm. "Evaluation of a Fuel Cell for Powering the Electrical Load of ICE Vehicles." In *Clean Electrical Power, 2007. ICCEP '07. International Conference on*, pp. 74-77. IEEE, 2007.

7. Yuanbin, Yu, Wang Qingnian, Hu Changjian, and Wang Boshi. "The feasibility and superiority of super-capacitors on mild hybrid electric vehicle." *InMechatronics and Automation, 2009. ICMA 2009. International Conference on*, pp. 1347-1351. IEEE, 2009.

8. Kun, L. I. A. N. G. "Super Capacitor Assisted Engine Starting System Modeling." *Mechanical Engineering & Automation* 4 (2012): 014.

9. Yuhimenko, V., M. Averbukh, G. Agranovich, and A. Kuperman. "Dynamics of supercapacitor bank with uncontrolled active balancer for engine starting."*Energy Conversion and Management* 88 (2014): 106-112.

10. Kertész, C-Z., and Paul Nicolae Borza. "Starter aiding system based on supercapacitors for the LDE2100 locomotive." In *Design and Technology of Electronics Packages, (SIITME) 2009 15th International Symposium for*, pp. 239-244. IEEE, 2009.

11. Stanca, Aurel Cornel, Iuliu Szekely, and Adrian Mailat. "STRATEGIES FOR PERFORMANCE OPTIMIZATION IN SUPERCAPACITOR-BASED ICE STARTING SYSTEMS."

12. M. Averbukh, S. Lineykin and A. Kuperman. Portable ultracapacitor-based power source for emergency starting of internal combustion engines. Power Electronics, IEEE Transactions on 30(8), pp. 4283-4290. 2015. DOI: 10.1109/TPEL.2014.2355422.

13. Chheda, Vijay, and D. Y. Vernekar. *Hybrid Power Pack (Ultra Capacitor+Battery) for Two Wheelers Fitted with Starter Motor*. No. 2009-26-0077. SAE Technical Paper, 2009.

14. Zhou, Jian Hao, Jia Yi Du, Yin Nan Yuan, and Deng Pan Zhang. "Analysis on Low Temperature Cold Starting Performance of Parallel Hybrid Electric Vehicle with Ultra-Capacitor." *Applied Mechanics and Materials* 43 (2011): 119-122.

15. STANCA, Aurel Cornel, Venetia SANDU, and Iuliu SZEKELY. "Embedded System for Start of ICE with Hybrid Battery-Super-capacitor Sources."*Development and Application Systems* (2010): 82.

16. Auer, Juergen, and Christoph Wieser. "Ultracapacitor's in Automotive: Where and When Ever Power Needed." *Journal of Asian Electric Vehicles* 7, no. 1 (2009): 1257-1259.

17. Fiorenti, Simone, Jacopo Guanetti, Yann Guezennec, and Simona Onori. "Modeling and experimental validation of a Hybridized Energy Storage System for automotive applications." *Journal of Power Sources* 241 (2013): 112-120.

SUMMARY OF THE INVENTION

Embodiments herein present an ultracapacitor-based power source (denoted herein the UC power source), optionally suitable for emergency starting of an internal combustion engine (ICE) when the vehicle battery is weak. The UC power source is based on an interaction between the rich energy content of some batteries (e.g. lead-acid batteries) and the power capabilities of UCs. The UC is charged at a low rate from any suitable energy source (such as the starter battery used to start the starter, even when discharged or empty, or another battery) and, when adequately charged, is capable of providing a current burst which is greater than the current which would be provided by the starter battery.

Embodiments of the UC power source are suitable for use with equipment which requires short high-current pulses, such as an engine starter, an ultrashort pulse laser or other similar equipment. The UC power source is particularly useful for devices with relatively weak power sources, which may experience difficulties providing the current pulse needed by the device.

The connection to a weak battery provides full charging of the UC at relatively low rate (depending on the battery "weakness"). At the appropriate time, the stored charge may be rapidly delivered by the UC to a device requiring rapid or emergency powering at a high rate, as shown conceptually in FIG. 1.

The UC power source may work with a wide range of batteries, and may be optionally used for starting a starting system (denoted herein a starter), such as a vehicle cranking motor. Optionally the UC power source is connected to the battery by typical flexible cables with externally insulated alligator clamps.

According to an aspect of some embodiments of the present invention there is provided an ultracapacitor-based power source, for backup starting of a starter powered by a starter battery. The UC power source includes:

i) an ultracapacitor (UC);
ii) a charger which charges the UC from an energy source;
iii) output connections for connecting the power source to the starter in parallel with the starter battery; and
iv) a power source controller which starts the starter from the UC by connecting the UC to the outputs so as to direct current flow from the UC to the starter.

According to some embodiments of the invention, the power source further includes a first switch electrically connected between the UC and the first output. The first switch is controlled by the power source controller. The power source controller directs and prevents current flow from the UC to the outputs by controlling the state of the first switch. According to further embodiments of the invention, the UC power further includes a second switch electrically connected between the UC and the second output. The second switch is controlled by the power source controller. The power source controller directs and prevents current flow from the UC to the outputs by controlling the state of one or both of the switches.

According to some embodiments of the invention, the power source further includes a battery voltage sensor which measures the voltage level across the starter battery.

According to some embodiments of the invention, the power source further includes a UC voltage sensor which measures a voltage level across the UC.

According to some embodiments of the invention, the charger is a buck-boost converter.

According to some embodiments of the invention, the energy source is the starter battery.

According to some embodiments of the invention, the controller alternates the UC charging mode between current limiter mode and current source mode in accordance with voltage levels of the starter battery and the UC.

According to some embodiments of the invention, the energy source is an alternating current (AC) energy source and the charger is an AC to direct current (DC) converter.

According to some embodiments of the invention, the energy source is a DC energy source and the charger is a DC to DC converter.

According to some embodiments of the invention, the controller delays the connecting by a time period selected to maximize the reliability of the starting by the UC.

According to some embodiments of the invention, the power source is portable.

According to some embodiments of the invention, the power source further includes a cable for electrically connecting one of the output connections to a terminal of the starter battery. The cable includes a battery clamp having jaws for attaching to the battery terminal. Conductive portions on the interiors of the jaws are electrically connected when the clamp is attached to the terminal and are electrically disconnected when the clamp is detached from the terminal. According to some embodiments of the invention, the exterior of the clamp is electrically insulated.

According to some embodiments of the invention, the power source controller monitors the voltage level of the starter battery, and detects a failure of the starter battery to start the starter by identifying a drop in battery voltage in the absence of a current burst required for starting the starter.

According to some embodiments of the invention, the power source controller automatically connects the UC to the outputs when the failure is detected.

According to some embodiments of the invention, the power source controller connects the UC to the outputs in response to a trigger signal.

According to an aspect of some embodiments of the present invention there is provided a method of starting a starter with a UC-based power source. The starter is powered by a starter battery. The UC-based power source includes:

i) an ultracapacitor (UC);
ii) a charger which charges the UC from an energy source;
iii) output connections for connecting the power source to the starter in parallel with the starter battery; and
iv) at least one switch which connect and disconnect the UC and the outputs so as to control current flow from the UC to the starter.

The method includes charging the UC, from the energy source, to a level required for providing a current burst sufficient to start the starter, and starting the starter from the UC by directing current flow from the UC to the starter.

According to some embodiments of the invention, the energy source is an alternating current (AC) energy source and the charger is an AC to direct current (DC) converter.

According to some embodiments of the invention, the energy source is a DC energy source and the charger is a DC to DC converter.

According to some embodiments of the invention, the charger selectably operates in current limiter and current driver modes, and the method further includes determining respective voltages of the DC energy source and the UC and selecting an operating mode for the charger. The operating mode is selected by:

i) when the ratio of the UC voltage to the DC energy source voltage is lower than a first specified value, charging the UC in current limiter mode;
ii) when the ratio of the UC voltage to the battery voltage is between the first specified value and a second specified value, charging the UC in current driver mode, wherein the second specified value is greater than the first specified value; and
iii) when the ratio of the UC voltage to the battery voltage is greater than the second specified value, operating in standby mode.

According to some embodiments of the invention, the first specified level is less than one and the second specified value is greater than one.

According to some embodiments of the invention, the energy source is the starter battery.

According to some embodiments of the invention, directing current flow includes closing at least one switch between the ultracapacitor and an output connection.

According to some embodiments of the invention, the method further includes delaying the starting by a time period selected to maximize the reliability of starting the starter from the UC.

According to some embodiments of the invention, the method further includes detecting a failure of the starter battery to start the starter and automatically directing the current flow from the UC to the starter. According to some embodiments of the invention, detecting the failure includes identifying a drop in battery voltage in the absence of a current burst required for starting the starter.

According to some embodiments of the invention, directing the current flow from the UC to the starter is triggered by an external trigger signal.

According to some embodiments of the invention, the method further includes running a testing pulse sequence to update the battery and UC voltages, and selecting the charging mode in accordance with the updated battery and UC voltages.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings and image. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
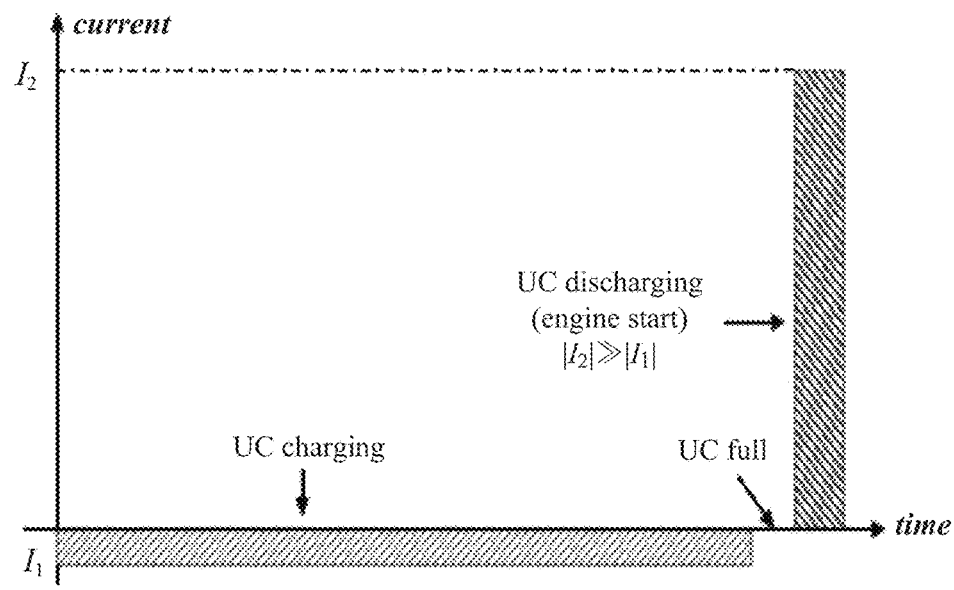
FIG. 1 illustrates rapid discharge from a UC to a device requiring high rate powering.

The present invention, in some embodiments thereof, relates to an ultracapacitor-based power source, and, more particularly, but not exclusively, to an ultracapacitor-based power source for emergency starting of an internal combustion engine.

A power source for emergency starting of starter motors requires short and intensive current pulses. One example is the cranking motor for an internal combustion engines. When the internal vehicle battery is empty or weak it may not be able to provide the necessary current for starting the vehicle. The UC power source described herein may be charged by a weak battery and yet is able to supply pulses of high power (i.e. current) which are sufficient for starting. Embodiments of the UC power source are implemented by a synergetic cooperation between ultracapacitors (UCs) and energy sources such as conventional electrochemical batteries. The cooperation between UC and the energy source results in a high-power UC power source enables makes viable a portable starting device with low weight and dimensions.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The Engine Start Problem

Consider a battery represented by Thevenin equivalent ($V_b$, $R_b$), connected to a cranking dc motor, represented by the following set of equations:

$$v = R_s i + E \tag{1}$$

$$J\frac{dw}{dt} = T_e - T_l(\omega)$$

$$E = k\omega$$

$$T_e = ki$$

where Rs is the stator resistance, E the back electromotive force, J the moment of inertia, ω the angular speed, k the torque constant, Te the electrical torque, and Tl is the load torque (increasing function of ω because of dominating friction component). Note that motor stator inductance is neglected since electrical time constant is usually much lower than the mechanical one.

Rearranging (1), there is:

$$\frac{J}{k^2}\frac{dE}{dt} = i - i_l(E) \tag{2}$$

$$v = R_s i + E$$

where $i_l = T_l/k$. Recall that the load torque is an increasing function of angular speed, therefore $i_l$ is an increasing function of E.

Figure 2:
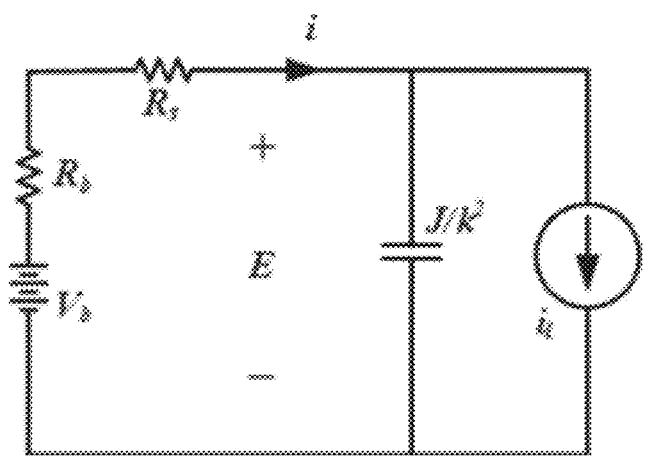
FIG. 2 is a simplified equivalent circuit of ICE starting system.

Reference is now made to FIG. 2, which is a simplified electrical-side reflected equivalent circuit of an ICE starting system. The equivalent circuit is described by:

$$\frac{J}{k^2}\frac{dE}{dt} = i - i_l(E)$$

$$V_b = (R_b + R_s)i + E. \tag{3}$$

In order to start an ICE, the cranking motor must be accelerated to a predetermined speed $\omega_C$, i.e., the equivalent capacitor in FIG. 2 must be charged to E=EC=k·ωC. The steady-state solution of (3) is:

$$E_{ss} = V_b - i_l(E_{ss})\cdot(R_b + R_s). \tag{4}$$

Therefore, for successful starting the following must hold:

$$V_b - i_l(E_{ss})\cdot(R_b + R_s) > EC. \tag{5}$$

During lead-acid battery depletion, $V_b$ slightly reduces while $R_b$ experiences sharp increase, depending on both SOC and SOH. In order to fulfill (5), $R_b$ must satisfy:

$$R_b < R_{bC} = \frac{V_b - E_C}{i_l(E_{ss})} - R_s \tag{6}$$

at all times. Once $R_b$ increases above $R_{bC}$, the battery is referred to as "weak", i.e., incapable of providing starting current yet possessing sufficient capacity required for starting. It is important to note that the battery is still capable of providing charge at low rates (dictated by the instantaneous values of $V_b$ and $R_b$).

UC Power Source

Figure 3:
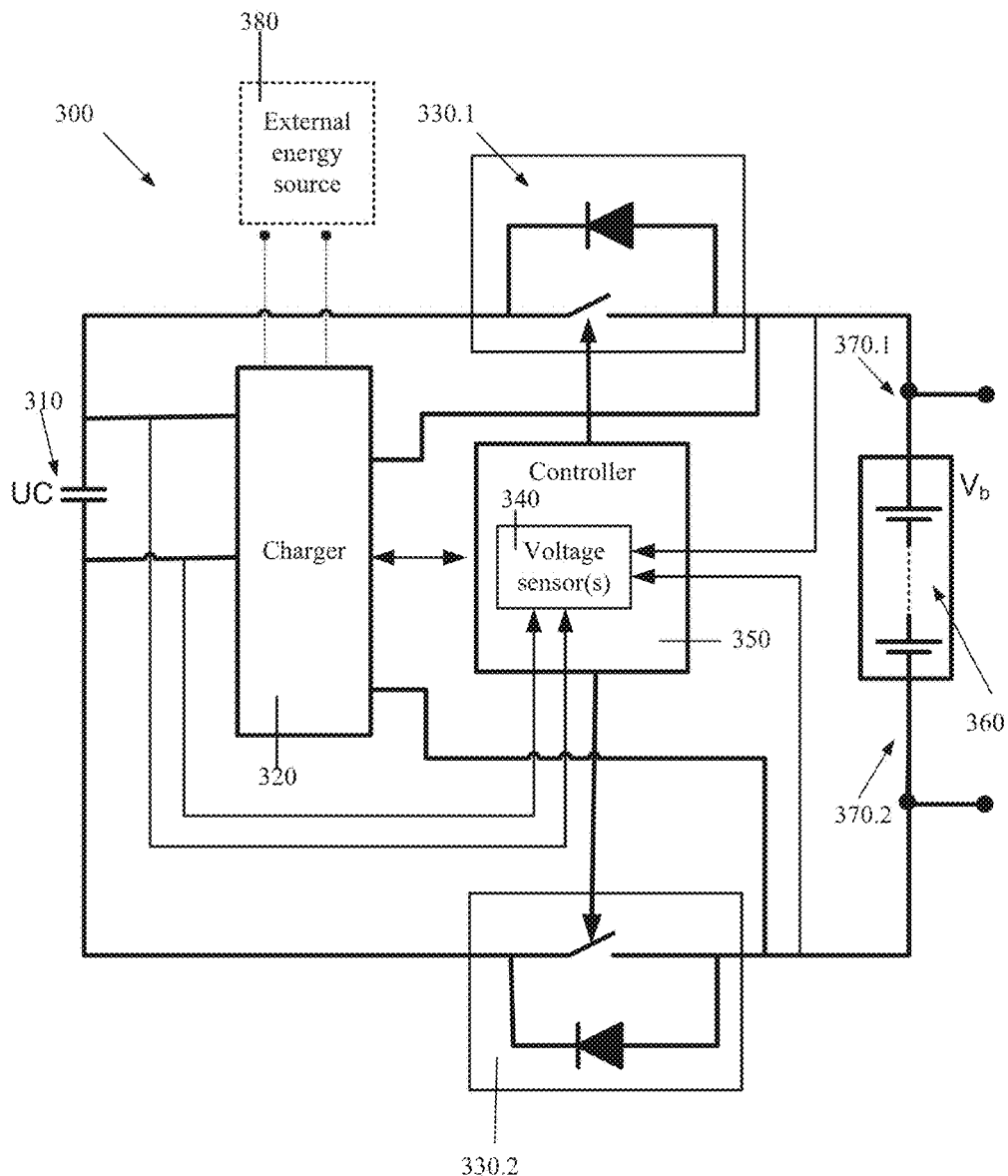
FIG. 3 is a simplified block diagram of a UC power source, according to embodiments of the invention.

Reference is now made to FIG. 3, which is a simplified block diagram of a UC power source according to embodiments of the invention.

Power source 300 includes:
a) Ultracapacitor (UC) 310;
b) Charger 320;
c) At least one switch (330.1 and/or 330.2);
d) At least one voltage sensor 340; and
e) Power source controller 350.

Power source 300 connects in parallel with starter battery 360 which is used to start a starter (not shown). Optionally battery 360 is an ECB.

Figure 4A:
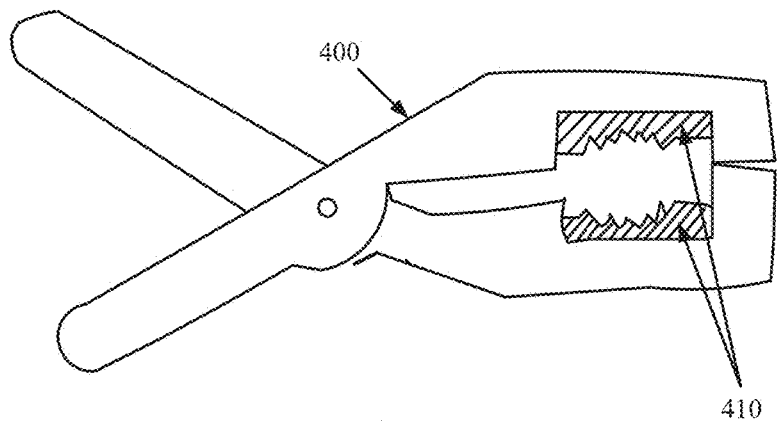
FIGS. 4A and 4B are simplified illustrations of a clamp unattached and attached to a battery terminal respectively, according to embodiments of the invention.
Figure 4B:
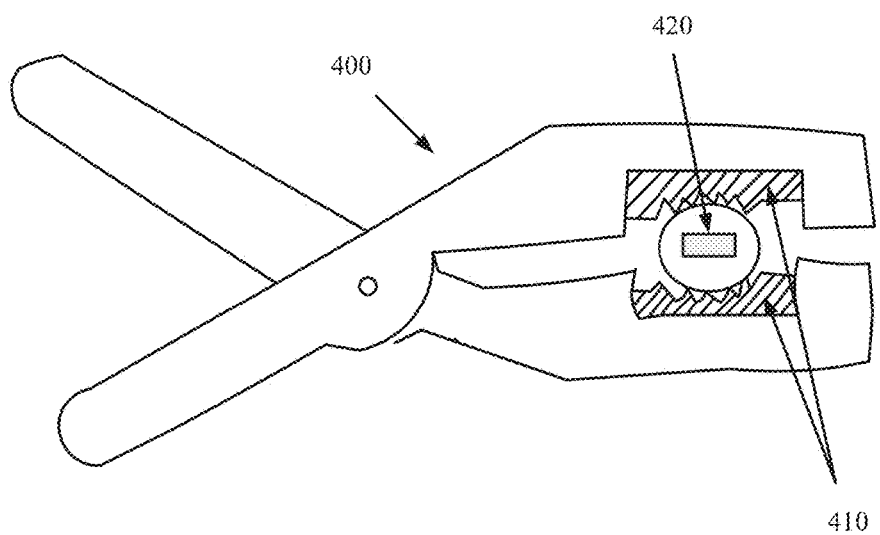

Connection points 370.1 and 370.2 illustrate schematically the parallel connection between battery 360, power source 300 and the starter. It is noted the connection points 370.1 and 370.2 shown in a non-limiting manner to assist in the clarity of the description. Optionally, other electrical and/or physical elements are located between power source 360 and/or battery 360 and/or starter (for example flexible cables and clamps as illustrated in FIGS. 4A and 4B), where these additional elements do not interfere with the current transfer from UC 310 to the starter.

Optionally power source 300 is easily connected and disconnected from battery 360 (e.g. using automotive-type alligator clamps). The easy connection is particularly useful for portable UC-based power sources. In alternate embodiments, the connection is fixed and requires assembly and disassembly to battery 360 (e.g. when the power source is located within a particular vehicle).

Ultracapacitor

UC 310 accumulates charge which provides current to the starter when battery 360 is too weak to start the motor. UC 310 may be charged slowly over time from a relatively weak energy source until it accumulates enough charge to provide the necessary current burst when connected to the starter. UC readiness to provide this current burst may be evaluated by the voltage across UC 310.

Charger

Charger 320 charges UC 310 from an energy source. Optionally, the energy source is battery 360. Alternately or additionally, the energy source is external energy source 380 (shown in dashed lines). Optionally power source 300 includes a power socket or other type of connection which enables external energy source 380 to be connected and disconnected.

Optionally the energy source is one of:
1) Starter battery 360;
2) An external DC energy source (e.g. battery, high-power USB port, fuel cell or portable device charger); and
3) An external AC energy source (e.g. wall socket, portable generator or diesel generator).

Charger 320 adapts the power provided by the energy source to the DC level required to charge UC 310. The type of charger depends on the power source (e.g. DC/DC for DC sources and AC/DC for AC sources). The time to charge UC 310 will vary based on the energy source.

Optionally the charger is one of:
i) A current limiter converter;
ii) A current driver converter; and
iii) A buck-boost converter.

In some cases in order to obtain reliable starting by power source 300, it is desired to charge UC 310 to a voltage level which is higher than $V_b$, the voltage level of battery 360.

Optionally charger 320 operates as a buck-boost DC/DC voltage converter. Charger 320 operates in buck mode when $V_{UC}$, the voltage across UC 310, is lower than $V_b$, and in boost mode when $V_{UC}$ is greater than $V_b$. As described below, $V_b$ and $V_{UC}$ (and in particular their relative values) may be used as part of the control logic for controlling charger operation.

Voltage Sensors

Power source 300 includes a battery voltage sensor measuring $V_b$, the voltage level of battery 360. $V_b$ indicates the battery state-of-charge and state-of-health.

Optionally, power 300 additionally includes a UC voltage sensor measuring $V_{UC}$, the voltage level of UC 310. $V_{UC}$ indicates the UC state-of-charge and may be used for current estimation to determine whether the UC has accumulated enough charge to reliably start the starter.

As described below, $V_b$ and $V_{UC}$ (and in particular their relative values) may be used as part of the control logic for controlling charger operation.

In some embodiments, the battery state-of-charge and state-of-health are displayed to a user. This information may assist the user to determine whether the battery should be charged or replace battery. Alternately, a processor monitors $V_b$ and $V_{UC}$ and issues alerts to the user when attention is needed.

In the non-limiting embodiment of FIG. 3, voltage sensor (or sensors) 340 are shown as part of controller 350. However the sensors are not necessarily co-located; they may each be located in any portion of the power source circuitry from which measurement of the respective voltage may be performed.

Controller

When controller 350 identifies the beginning of a starting process (i.e. start attempt), controller 350 connects UC 310 to connection points 370.1 and 370.2 allowing charge to flow from UC 310 to the starter in a high current burst.

As used herein the term "start attempt" means an attempt to start the starter using the battery. A failed or unsuccessful start attempt occurs when the battery is incapable of providing the necessary starting current (for example, to obtain the required rotating velocity of the engine crank in an ICE).

Optionally, controller 350 controls switches 330.1 and/or 330.2 which connect and disconnect the UC terminals from outputs connections 370.1 and 370.2. Switches 330 may be any type of switch adequate for operating at the voltage and current levels required for charging and discharging UC 310. FIG. 3 illustrates an optional embodiment of a switch which includes a diode, as typically found in MOSFET power switches. Other types of switches, such as electromechanical relays or power transistors which do not include an internal diode, may be used.

The embodiment of FIG. 3 includes two switches 330.1 and 330.2, both of which must be closed to enable current to flow from UC 310 to the starter. In other embodiments only one switch is present and closing the single switch completes the circuit and enables UC 310 to provide current to the starter. The following description is directed at the dual-switch configuration but applies to single-switch embodiments as well, with the difference being whether power source controller 350 opens and closes a single switch or two switches. Additional switches may be present, optionally to protect against incorrect attachment of the UC power source to the battery. Two power switches may be connected in reverse manner, so that current may flow only if the controller provides opposite control signals to the switches as a pair.

Optionally, controller 350 monitors $V_b$ to identify an unsuccessful start attempt by battery 360. During an unsuccessful start attempt, the battery voltage drops quickly and but insufficient current flows from the battery.

Optionally, power source 300 includes a current sensor capable of determining whether a sufficient amount of current for starting has been pulsed from the battery to the starter. A false start attempt is identified when a rapid drop in $V_b$ is detected without detecting a sufficient current spike.

Optionally, controller 350 controls the operation of charger 320. An exemplary embodiment in which the controller switches a charger between current limiter and current source operation based on the values of $V_b$ and $V_{UC}$ is described in more detail below.

Optionally, controller 350 is powered by battery 360. Controller 350 requires a low amount of current (relative to the current required for starting). Therefore even a weak battery which is unable to start the starter may be sufficient to power controller 350.

Current Burst Delay

Optionally, after detecting a failed start attempt controller 350 delays connecting UC 310 to the battery/starter. The length of the delay may be selected by any means known in the art, including, but not limited to:
  i) Pre-specified value;
  ii) Dynamically calculated value based on current power source operating parameters;
  iii) Look-up table based on current power source operating parameters.

The delay ensures that the current from UC 310 to the starter is delivered at an optimal time that produces the maximum possible starter current. Even though the battery start attempt fails, it advances to transfer a certain amount of energy to the starter when UC 310 is connected with the appropriate time delay. The delay allows the power source to exploit a portion of the battery energy and this way to maximize the starter current. For example, in a cranking motor, the battery may be able to switch on a starter solenoid and begin the rotation of the cranking motor. When the delayed UC current pulse is timed correctly it enforces the maximum rotation velocity achieved during the battery start attempt. Optimal delays may be determined by any means known in the art, including, but not limited to, simulations, calculation and prototype test results.

Portability

In some embodiments the power source is portable. The portable power source is may be easily connected and disconnected from the starter, optionally using the clamp described below. A UC power source having relatively small weight and physical dimensions and capable of starting an internal combustion engine may be built with currently available power devices (e.g. switches, ultracapacitors, etc.). The weight of UC power source for starting a diesel engine up to 6 liters, as described herein, is in the range of 15-17 kg (including cables and clamps) with a volume of up to 18 liters.

Clamps

Optionally, power source 300 connects to the starter battery by a clamp (or clamps) with jaws which attach to the battery terminal. Optionally the clamp is attached at the end of an electrical cable (as shown in FIG. 5).

Reference is now made to FIGS. 4A and 4B which are simplified illustrations of a clamp, according to embodiments of the invention. Conductive inserts 410 on the interiors of the jaws are electrically connected when the clamp is attached to the battery terminal 420 (as seen in FIG. 4B) and are electrically disconnected when the clamp is detached from the terminal (as seen in FIG. 4A). The clamp protects against a short circuit by: a) disconnecting the positive and negative claims from each other during the out of service situation, and b) since clamp inserts 410 are electrically connected together only when the clamp is mounted on the battery terminal.

Optionally the clamp exteriors are electrically insulated. Thus inadvertent contact between two clamps does not result in a short circuit.

Figure 5:
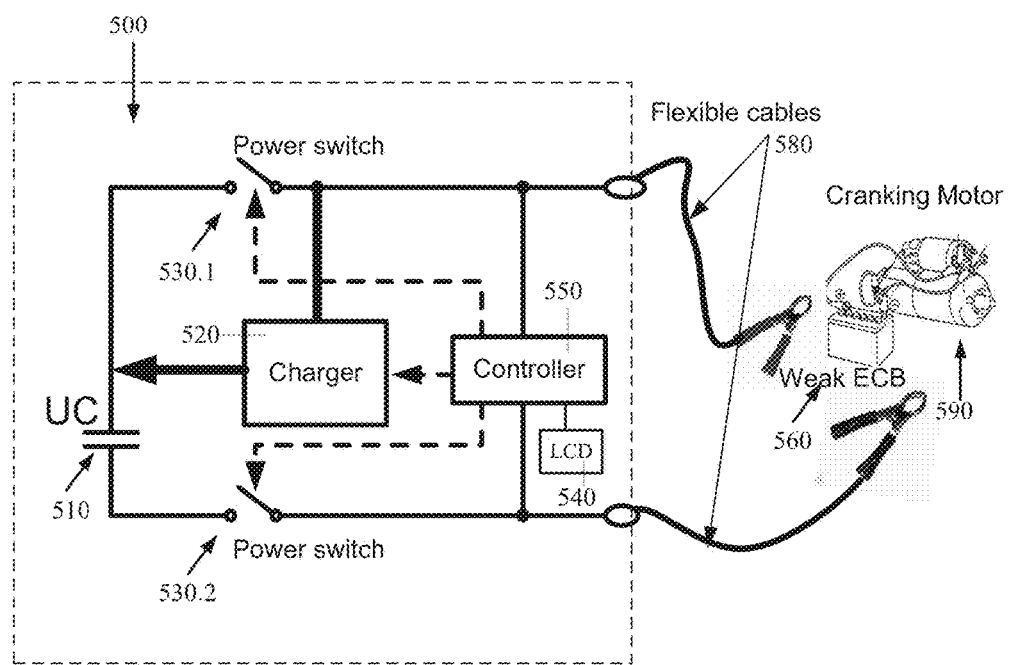
FIG. 5 is a simplified illustration of a UC power source for a starter, according to embodiments of the invention.

Reference is now made to FIG. 5, which is a simplified illustration of a UC power source for emergency starting of a starter (shown as cranking motor 590), according to embodiments of the invention. Power source 500 includes UC 510 which is charged by charger 520 from starter battery 560. Controller 550 opens and closes power switches 520.1 and 520.2. During charge transfer from battery 560 to UC 510 power switches 520.1 and 520.2 are open. During current transfer from UC 510 to cranking motor 590, power switches 520.1 and 520.2 are closed. UC power source 500 connects to the battery 560 using flexible cables 580 with alligator clips.

Optionally, power source 500 includes LCD display 540 for displaying information to a user.

Power Circuit with Cable Connection to Battery

Figure 6:
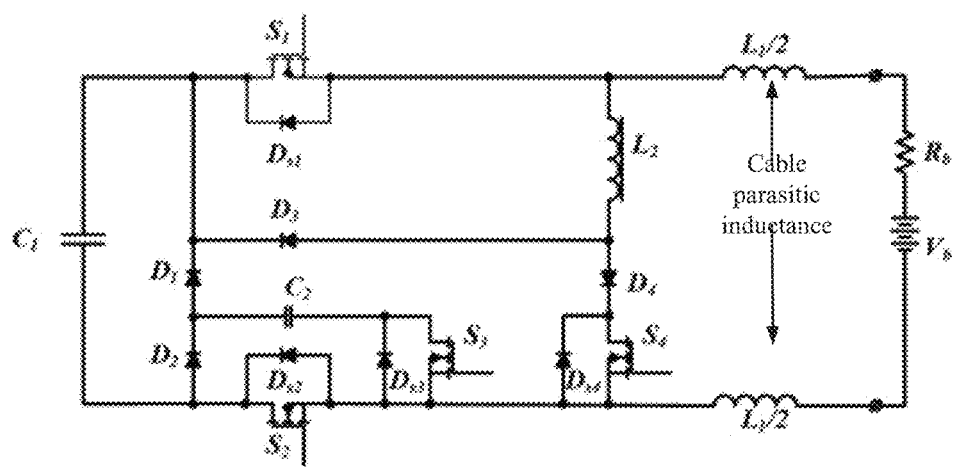
FIG. 6 is a first simplified circuit diagram of a UC power source, according to exemplary embodiments of the invention.

Reference is now made to FIG. 6 which is a first simplified circuit diagram of a UC power source according to exemplary embodiments of the invention. A detailed analysis of the operation of the FIG. 6 power source circuit is presented in sections a-c below.

The power source circuit includes four power switches $S_1$-$S_4$ implemented by power MOSFETs with corresponding built-in diodes $D_{s1}$-$D_{s4}$, power diodes $D_1$-$D_4$, UC $C_1$, snubber capacitor $C_2$ and inductor $L_2$. In FIG. 6, the power source is connected to a battery represented by Thevenin equivalent $V_b$, $R_b$ via cables with total parasitic inductance of $L_1$. Parasitic inductance of long connecting cables is sufficient (~2 to 3 μH in the proposed device). This inductivity could not be bypassed by a freewheeling diode, since connecting cables are outside the device. In the power source of FIG. 6 this characteristic, which is usually treated as drawback, is utilized as a charger coil.

Power components roles are as follows. $S_1$, $S_2$, and $D_4$ protect the circuit against reverse polarity, short-circuiting, and spontaneous discharge of UC back into the battery and provide controlled connection of the UC to the crank motor. In addition, $S_2$ is a controllable switching element in the PWM circuit of the charger. $S_3$ prevents sparking on cable clamps caused by spontaneous charging of $C_2$ through cable inductance $L_1$ when cable clamps are connected to battery terminals. $S_4$ serves as a switching element of PWM circuit of the charger, which also includes inductor $L_2$ and diode $D_3$. Diodes $D_1$ and $D_2$ and capacitor $C_2$ comprise the snubbing circuit that prevents voltage surges due to the switching of $S_2$.

The charger operates as current limiter at the early stage of charging, when the voltage across the UC is significantly lower than ECB voltage, and as current source when the value of the UC voltage approaches the voltage across ECB.

a. Current Limiter Operation

Figure 7A:
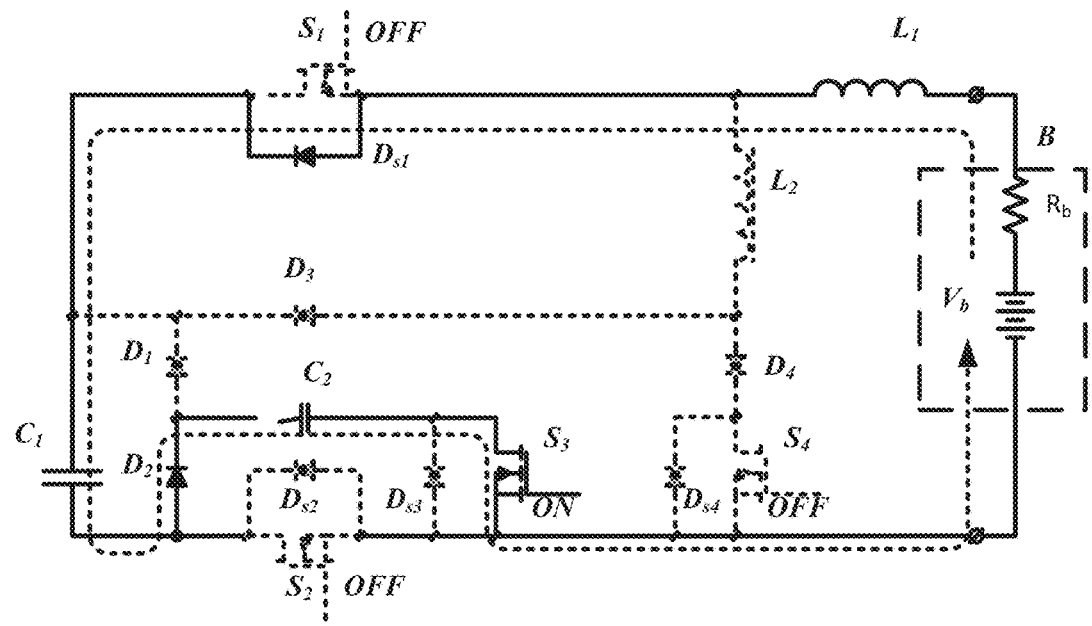
FIGS. 7A and 7B illustrate steady-state operation of the current limiter switching circuit.
Figure 7B:
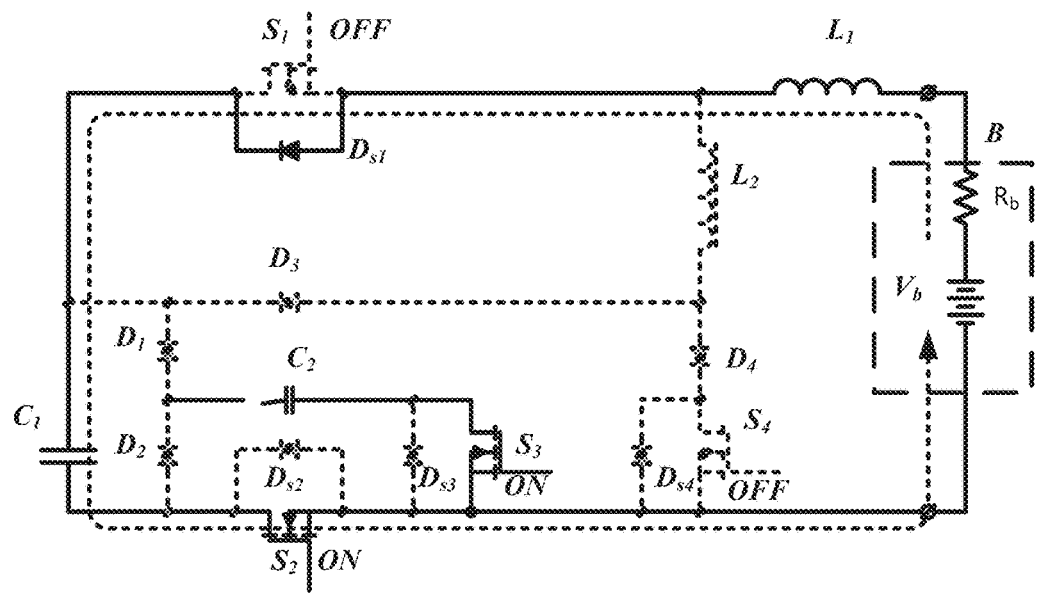

The cycles of the current limiter circuit operation are shown in FIGS. 7A and 7B. In FIG. 7A, switch $S_2$ is OFF and the snubbing capacitor $C_2$ prevents the circuit from inrush current. In FIG. 7B, $S_2$ is ON and the discharging current of $C_2$ flows into $C_1$ together with current that charges $L_1$.

FIG. 7A demonstrates charging of the snubbing capacitor $C_2$. During this portion of the cycle, the current charging $C_1$ and $C_2$ increases almost linearly with time. Due to huge capacitance of the UC $C_1$ (hundreds of farads), the voltage across it remains virtually unchanged over the cycle, allowing to consider it as a dc voltage source (assuming that time constant of the circuit is larger than the on-time $t_{on}$).

Thus, the current $i_{L_1}$ flowing through inductance $L_1$ is obtained as:

$$i_{L_1} = \frac{V_b - V_{C_1}}{L_1} t \qquad (7)$$

The direction of the current when $S_2$ is ON is shown in FIG. 7B. The behavior of currents in time domain during this portion of the cycle is shown in FIG. 8 during $t_{on}$.

Figure 8:
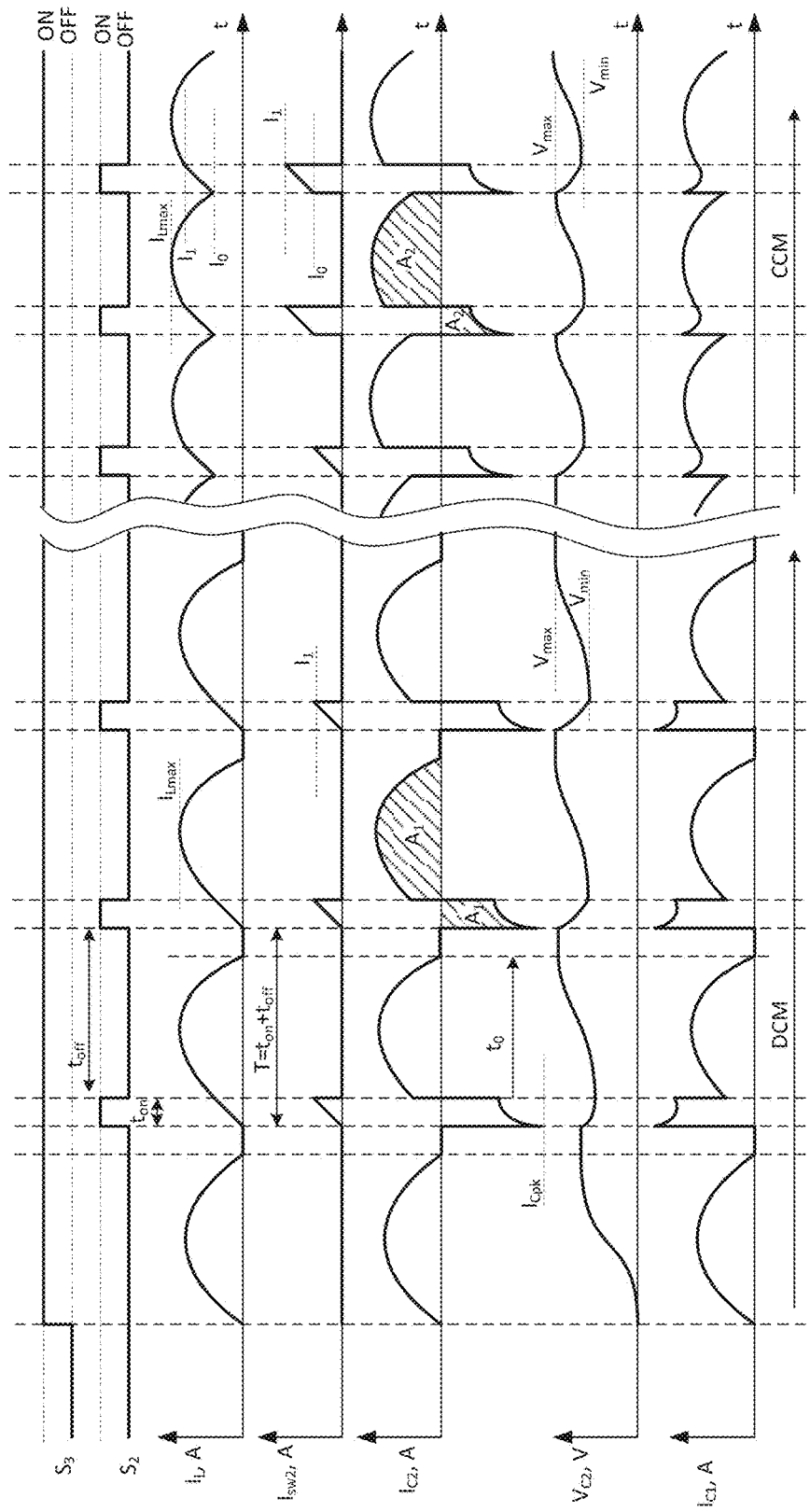
FIG. 8 illustrates the waveforms occurring during current limiter operation.

FIG. 8 shows the waveforms occurring during current limiter operation for both continuous conduction mode (CCM) and discontinuous conduction mode (DCM) operations.

The topology shown in FIG. 7A occurs when $S_2$ is turned OFF. The current developed in $L_1$ during the ON time is redirected to the capacitor $C_2$. Again, taking into account that UC $C_1$ is very large, it is considered as a constant voltage source for a short time. Thus, the behavior of the circuit is described by the following differential equation:

$$L_1 C_2 v''_{C_2}(t) + R_{tot} C_2 v'_{C_2}(t) + v_{C_2}(t) = V_b - V_{uc} \qquad (8)$$

where $v_{C_2}$ is voltage across the capacitor $C_2$. The initial conditions are:

$$i_{C_2}(0) = C_2 v'_{C_2}(0) = i_{L_1}(t_{on}) = I_1 \qquad (9)$$

$$v_c(0) = v_{min} \qquad (10)$$

where $v_{min}$ is the value of voltage remaining after discharge during $t_{on}$ (see FIG. 8). In case $t_{on}$ is much higher than time constant of discharging circuit of $C_2$, the voltage $v_{min}$ may be assumed small enough to be neglected.

The complete solution of the equation is cumbersome and includes hyperbolic and exponential functions.

Nevertheless, for a circuit where the quality factor Q is large enough (Q>1.6) and total value of resistance is small enough, the solution for the current may be simplified as:

$$i_{L_1}(t) = (V_b - V_{C_2}) \left( \frac{t_{on}}{L_1} \cos\left(\frac{t}{\sqrt{C_2 L_1}}\right) + \sqrt{\frac{C_2}{L_1}} \cdot \sin\left(\frac{t}{\sqrt{C_2 L_1}}\right) \right) \qquad (11)$$

This simplification causes the value of the calculated current to be higher than the realistic value, thus the error of calculation provides an additional safety factor. Furthermore, the current $i_{L_1}$ will be equal to zero at the time $t_0$:

$$t_0 = \sqrt{C_2 L_1} \cos^{-1}\left(-\frac{\sqrt{C_2 L_1}}{\sqrt{C_2 L_1 + t_{on}^2}}\right). \qquad (12)$$

From (11), the maximum (peak) value of the current during single cycle depends on $t_{on}$ and cannot be higher than:

$$i_{L_1 pk} = \frac{V_b - V_{C_2}}{L_1} \sqrt{C_2 L_1 + t_{on}^2} . \qquad (13)$$

The average value of the battery current may be calculated from:

$$i_{L_{1avg}} = \frac{1}{T}\frac{V_b - V_{C_2}}{L_1}\frac{t_{on}^2}{2} + \frac{1}{T}\int_0^{\tau_0} i_{L_1}(t)\,dt. \quad (14)$$

$$i_{L_{1avg}} = \frac{V_b - V_{C_2}}{L_1}\left(C_2^2 - \frac{t_{on}^2}{2L_1} + \frac{\sqrt{C_2 L_1 + t_{on}^2}}{\sqrt{L_1/C_2}}\right) \quad (15)$$

Taking it into account that in steady state, average current through $C_2$ is zero, the discharging current of C2 is equal to second (integration) term of (14). In FIG. 8 it is shown by shaded areas $A_1$ and $A_2$ of the $I_{c2}$ waveform. Thus, the average UC current, which is the sum of $i_{L_{1avg}}$ and the average value of discharging current of $C_2$, may be derived as:

$$i_{C_{2avg}} = \frac{1}{T}\frac{V_b - V_{C_2}}{L_1}\frac{t_{on}^2}{2} + \frac{2}{T}\int_0^{\tau_0} i_{L_1}(t)\,dt = \quad (16)$$

$$\frac{V_b - V_{C_2}}{L_1}t_{on}^2\left(2C_2^2 - \frac{t_{on}^2}{2L_1} + \frac{2\sqrt{C_2 L_1 + t_{on}^2}}{\sqrt{L_1/C_2}}\right).$$

From (15) and (16), the ratio of ECB to UC average currents (for low values of UC voltage) may be expressed as:

$$K = \frac{i_{L_{1avg}}}{i_{C_{2avg}}} = 1 - \frac{2}{5 - \sqrt{1 + (t_{on}^2/C_2 L_1)}} \quad (17)$$

In particular, for $t_{on} \ll \sqrt{C_2 L_1}$ (the period of self-oscillations of the resonant circuit), $K \approx \frac{1}{2}$. In cases where the average UC current may be found from measurements, ECB current may be obtained from (17) as:

$$I_{B\_avg} = I_{L1avg} \approx \frac{1}{2}I_{UCavg}. \quad (18)$$

Ratings of the average and instantaneous ECB currents $I^*_{L1avg}$ and $I^*_{L1pk}$, respectively, are selected to avoid damage to the system. These values depend on battery type and vary from one ECB to another. For purpose of the description herein, these values were chosen as 50 and 100 A correspondingly.

Having these values, one may calculate $t_{on}$ and T using expressions (13) and (15) as:

$$t_{on} \le \sqrt{L_1}\sqrt{\frac{(I^*_{L1pk})^2 \cdot L_1}{(V_b - V_{UC})^2} - C_2} \quad (19)$$

$$T \ge \max\left(\left(C_2 - \frac{t_{on}^2}{2L_1} + \sqrt{C_2}\sqrt{C_2 - \frac{t_{on}^2}{2L_1}}\right) \times \frac{(V_b - V_{UC})}{i_{L1avg}}, t_{on} + t_0\right) \quad (20)$$

respectively. In (20), the period T should be considered as maximum of the two possible values: the first calculated from (15) and the second being the minimum possible value of the period T that corresponds to DCM mode of operation.

b. Current-Source Operation

Figure 9A:
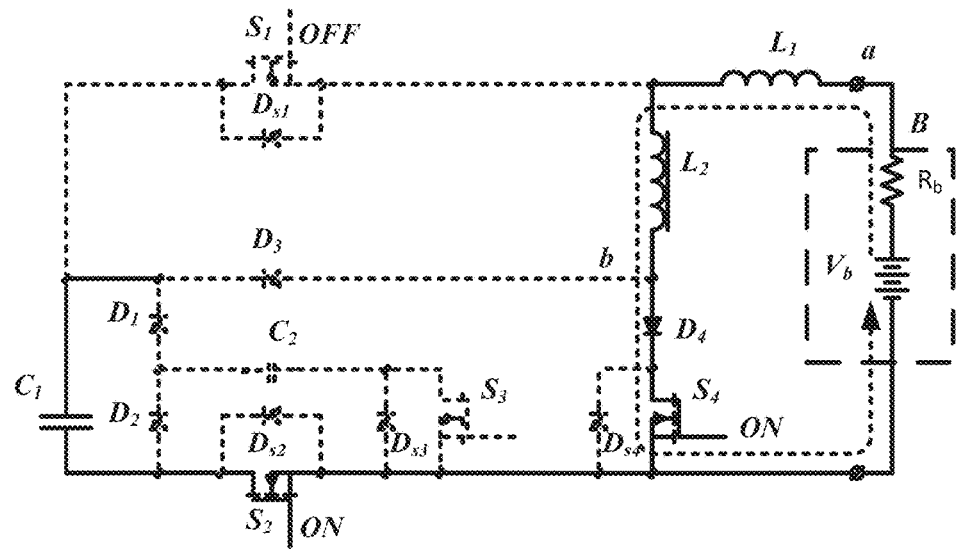
FIGS. 9A and 9B illustrate topologies of current source switching circuit operation.
Figure 9B:
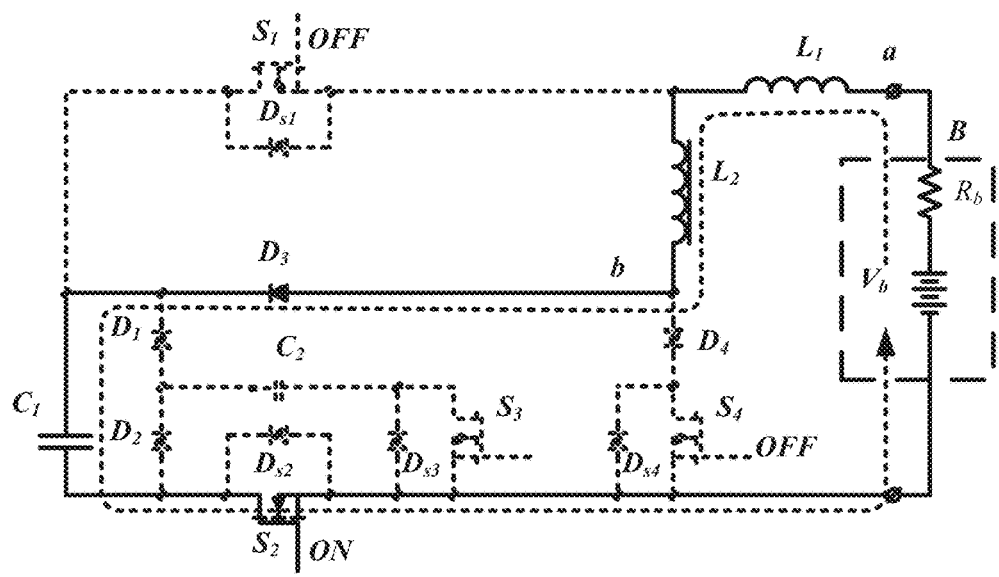

When the UC voltage is close to the battery voltage, limiting the current is unnecessary. On the contrary, the current has to be pumped from the battery into $C_1$ as fast as possible. The topologies of current source operation are shown in FIGS. 9A and 9B.

During current source operation, transistor $S_4$ operates as a power switch. The series connection of inductors $L_1$ and $L_2$ may be assumed to be equal to $L_2$ since $L_2 \gg L_1$. Thus, the current through $L_2$ increases while transistor $S_4$ is ON. When $S_4$ is OFF, the current increases whenever the potential at point b is lower than the one at point a (see FIGS. 9A and 9B).

Figure 10:
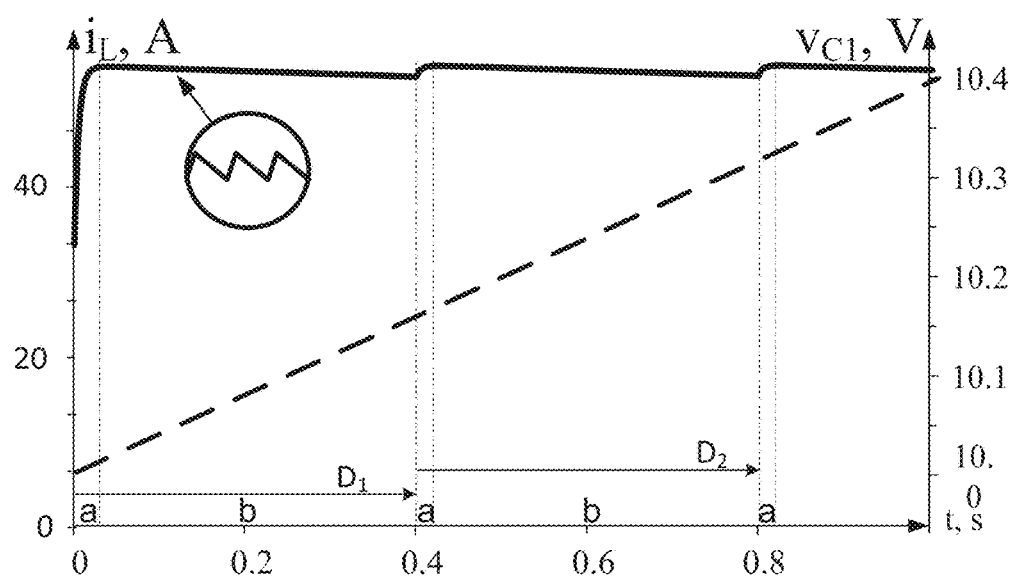
FIG. 10 shows UC voltage and inductor current during current source operation.

FIG. 10 shows the voltage and current during current source operation. The UC voltage is shown by dashed line. Inductor current is depicted by solid line. The zoomed portion within the circle shows a fragment of the high frequency current ripple. During the first 400 ms the duty cycle is $D_1$. In sector "a," the current increases from an initial state up to a steady-state condition. In sector "b," the steady-state condition is reached and current slightly goes down due to UC voltage increase. New duty cycle $D_2 > D_1$ compensates for the current drop.

When the potentials are equal, steady state is achieved and the current does not increase anymore. This steady state remains while duty cycle is unchanged. During this time, the value of the current slightly reduces due to slow increase of UC voltage. After some time, the duty cycle must be updated to compensate for the current decrease.

Note that power switch $S_2$ is always ON during current-source operation mode, serving as a protection switch. $S_2$ may be used to abruptly reduce inductor current to zero. This allows emergency reset of the system, overcurrent protection, and fast stop after UC is fully charged. When activated, the charging process stops and the circuit enters the "standby" or "ready-to-start" mode. During this mode, all the switches are OFF to prevent spontaneous discharge of the UC.

c. Emergency Starting

When a failed start attempt is made, the terminal voltage of a weak ECB drops sharply due to high internal resistance. Optionally, the controller recognizes the voltage reduction as emergency (i.e. failed) start mode and turns ON power switches $S_1$ and $S_2$, connecting $C_1$ to the weak ECB. The UC internal resistance is significantly lower than that of the ECB, therefore nearly all of the ultracapacitor's current flows into the starter.

Power Circuit with Short Connection to Battery

Figure 11:
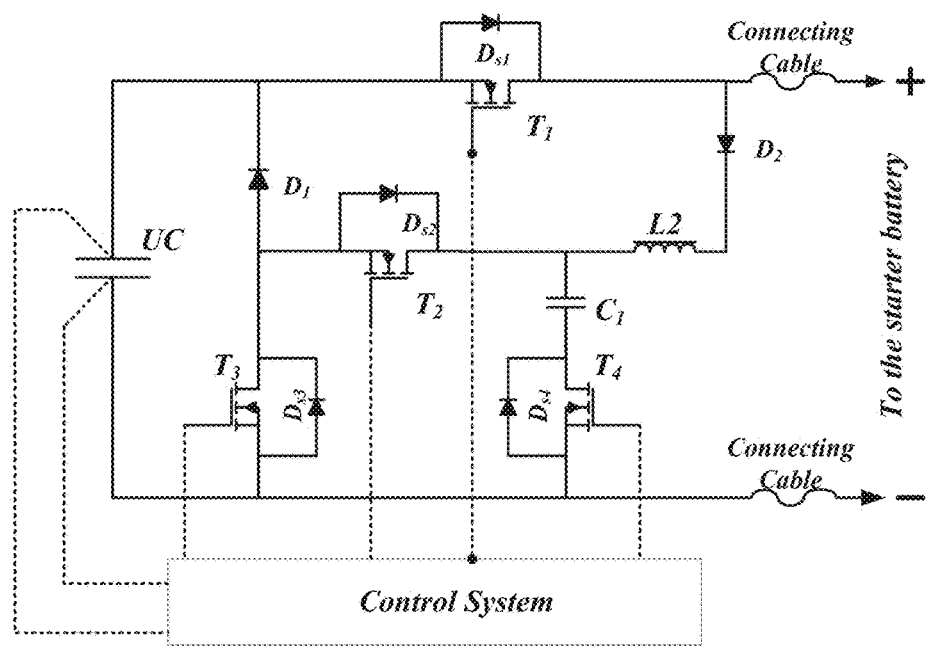
FIG. 11 is a second simplified circuit diagram of a UC power source, according to exemplary embodiments of the invention.

Reference is now made to FIG. 11 which is a second simplified circuit diagram of a UC power source according to exemplary embodiments of the invention. In contrast with FIG. 6, the FIG. 11 power source does not rely on cable inductance. It includes a single inductor L2 which enables operation in both current limiter and current driver modes. Therefore, the power source of FIG. 11 may be connected to the battery directly without requiring additional inductors to compensate for the absence of parasitic inductance from the cables.

Power Source Operation

Figure 12A:
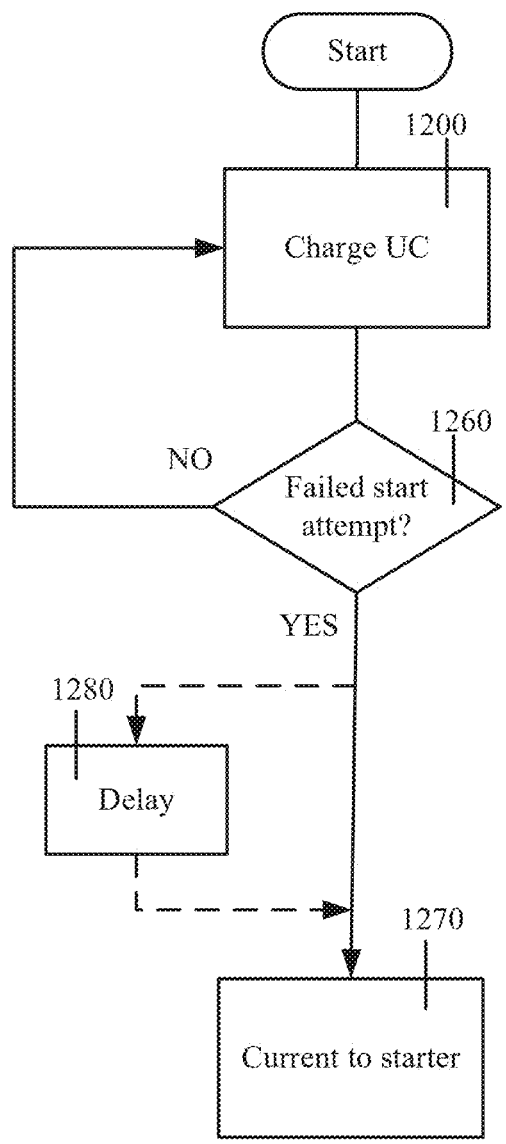
FIG. 12A is a simplified flowchart of a method for starting a starter motor with a UC-based power source, according to embodiments of the invention.

Reference is now made to FIG. 12A, which is a simplified flowchart of a method for starting a starter motor with a UC-based power source, according to embodiments of the invention. The power source operates substantially as described above, and includes a UC, charger, output connections to connect the power source to the starter in parallel with the starter battery and at least one switch for connecting and disconnecting the UC and the outputs.

In 1200, the UC is charged from an energy source to the level required to provide a current burst sufficient to start the starter. An exemplary embodiment of charging a UC from a DC power source is presented for FIG. 12B.

In 1260, a failed start attempt is detected. In some embodiments, failure is detected by receiving an external trigger signal. For example, the driver may manually trigger backup starting when the starting attempt fails. Alternately or additionally, the failed start attempt is detected by the UC-power source when the battery voltage fails but is not accompanied by the current burst required for successful starting.

In 1270 current flow is directed from the UC to the starter. Optionally, directing the current flow to the starter includes closing at least one switch between the UC and a battery terminal.

Optionally, in 1280 a delay is introduced between the time that the failed start attempt is detected and the time that the current is directed to the starter (as discussed above).

Current Limiter/Current Driver Charging

Figure 12B:
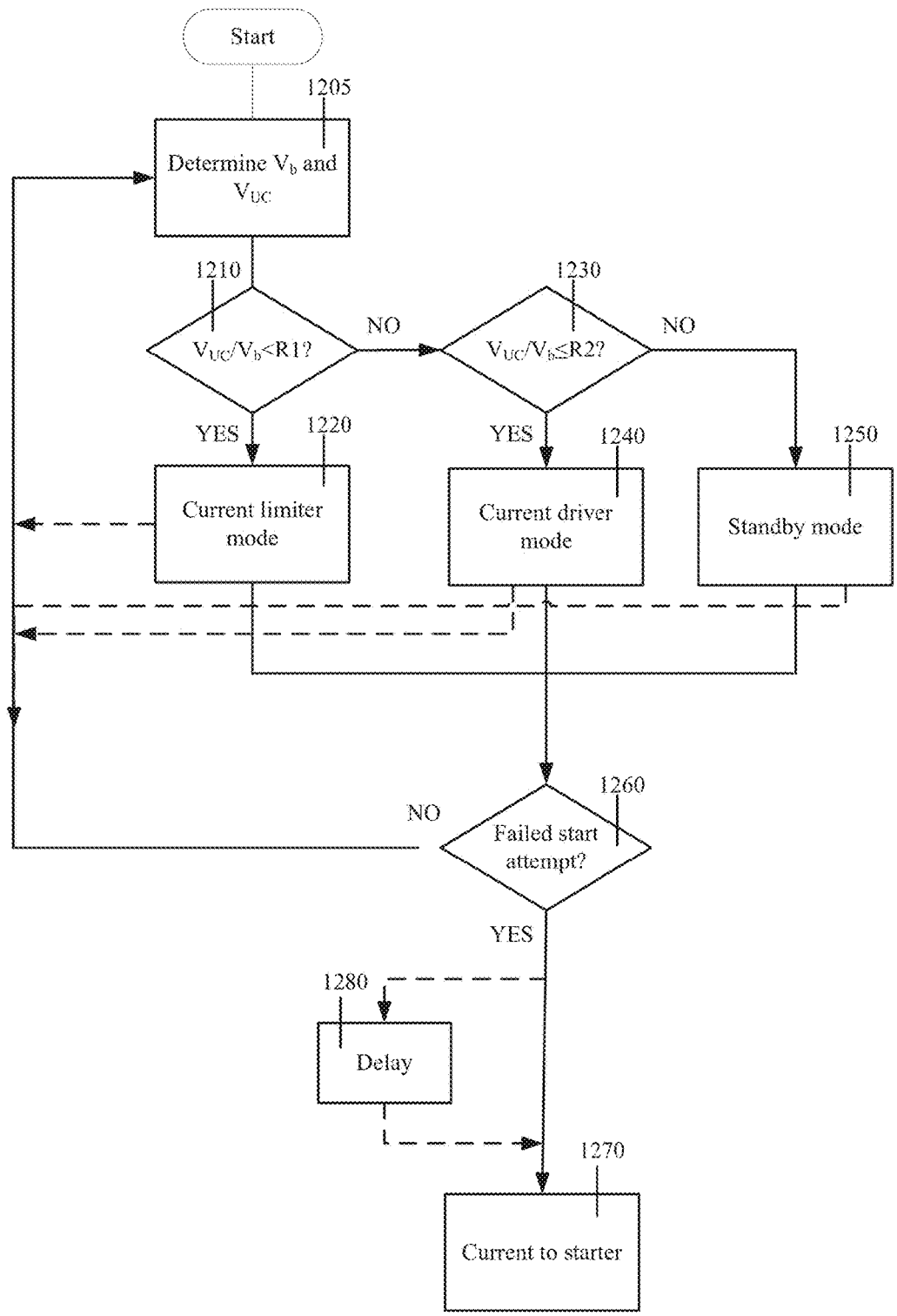
FIG. 12B is a simplified flowchart of a method for controlling a UC-based power source, according to embodiments of the invention.

Reference is now made to FIG. 12B, which is a simplified flowchart of a method for controlling a UC-based power source according to embodiments of the invention. The energy source used to charge the UC is a DC source, and the charger operates in current limiter and current driver modes. Optionally, the energy source used to charge the UC is the starter battery and the charger is a buck-boost converter.

An embodiment of charging the UC (1200 in FIG. 12A) is presented in FIG. 12B 1205-1250. In 1205, the battery and UC voltages are determined, optionally by sensors in the UC power source. The ratio $V_{UC}/V_b$ is used to select the operating mode by comparing it to two specified values R1 and R2, where R2 is greater than R1. In 1210, $V_{UC}/V_b$ is compared to a first specified value, R1. When $V_{UC}/V_b$ is less than R1, the UC is charged in current limiter mode 1220. In 1230, when $V_{UC}/V_b$ is between R1 and R2, the UC is charged in current driver mode 1249. When $V_{UC}/V_b$ is greater than R2, UC charging goes to standby mode 1250.

Optionally, R1<1 and R2>1. R1 is typically in the range of 0.80-0.85. R2 is typically in the range of 1.2-1.3. The specific values used for R1 and R2 are determined by the parameters of the UC power source, the device being started and other data.

Optionally, the values of $V_{UC}$ and $V_b$ are monitored, to ensure that the operating mode is correct for the current voltage levels. $V_{UC}$ and $V_b$ may be measured continuously, periodically and/or at specified times. Further optionally, measuring $V_{UC}$ and $V_b$ includes running a testing pulse sequence to update the battery and UC voltages.

Figure 13:
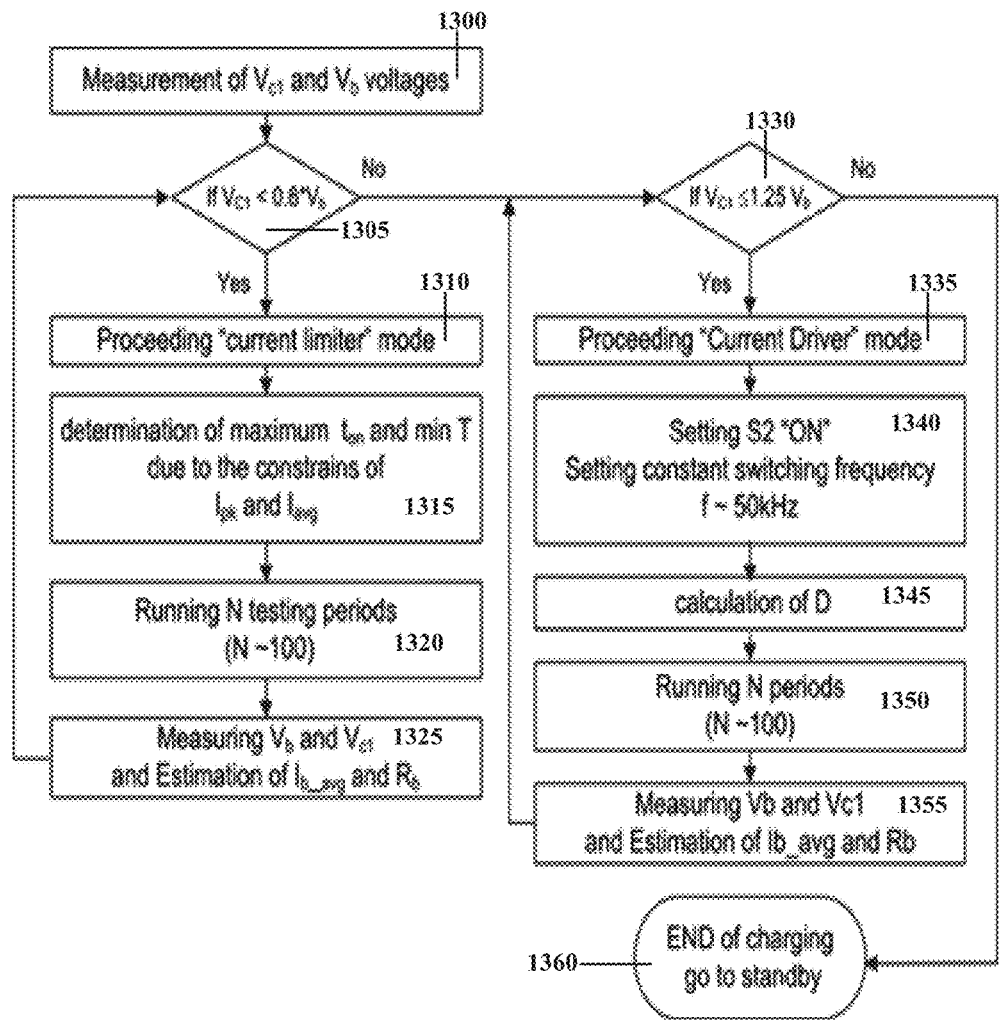
FIG. 13 is a simplified flowchart of a method for charging a UC in a UC-based power source, according to exemplary embodiments of the invention.

Reference is now made to FIG. 13, which is a simplified flowchart of a method for charging a UC in a UC-based power source, according to exemplary embodiments of the invention. In the non-limiting exemplary method, R1 equals 0.8 and R2 equals 1.25.

In 1300 the voltages across UC and the battery are measured. These voltages determine the management of the UC charging.

In 1305, with a low UC initial voltage ($V_{C_1} \leq 0.8\ V_b$), current limiter mode is activated in 1310. Otherwise in 1330, when $V_{C_1} \leq 1.25 V_b$, current source mode is applied in 1335. Finally, when the UC is fully charged $V_{C_1} > 1.25 V_b$, the device goes into standby mode in 1360.

Measurement of $V_b$ and $V_{C_1}$ with subsequent calculation of the battery current $I_{b\_avg}$ and battery internal resistance $R_b$ estimation (1325, 1355) takes place regularly using the testing pulse sequence (1320, 1350). The procedure for assessing the properties of the battery runs again every 1000-5000 pulses and serves for adaptive correction of UC charging current.

Average current flowing from the battery is an important parameter as well. In the case of current limiter mode, the average current is calculated using UC average current according to equation (18) or from energy equilibrium given by:

$$I_{L1avg} = \frac{\Delta C_{C_1}}{\Delta t} \cdot C_1 \cdot \frac{V_b}{V_{C_1}} \tag{21}$$

where $\Delta t$ and $\Delta V_{C_1}$ are testing sequence time of charging cycles and increase of the UC voltage during this time, respectively. In the case of the current-source mode, the average battery is calculated according to (15).

It is expected that during the life of a patent maturing from this application many relevant starters, motors, batteries, energy sources, ultracapacitors, clamps, switches, transistors, inductors, diodes, cables, power circuits and controllers will be developed and the scope of the terms starter, motor, battery, energy source, ultracapacitor, clamp, switch, transistor, inductor, diode, cable, power circuit and controller is intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental and simulation support in the following examples.

EXAMPLES

Reference is now made to the following examples, which together with the above descriptions illustrate some embodiments of the invention in a non limiting fashion.

A proposed UC-based power source was simulated using values given by Table I. The value of the parasitic inductance of the cables $L_1$ was measured and found in the range of several μH. Snubber capacitor $C_2$ was chosen to prevent the transistor from overvoltage (<10 V) under 100 A current condition. It was experimentally checked that UC of 500 F, 1.2 mΩ allows emergency starting of a 2.5 L, 200 HP diesel engine. As mentioned earlier, values of the $V_b$ and $R_b$ vary, depending on several factors. Nominal values were chosen for simulation needs.

TABLE 1

| Element | Nomenclature | Value | Units |
|---|---|---|---|
| Cable inductance | $L_1$ | 3μ | H |
| UC capacitance | $C_1$ | 500 | F |
| UC serial resistance | $R_{u\_c}$ | 1.2 m | Ω |
| ECB voltage | $V_b$ | 12 | V |
| ECB internal resistance | $R_b$ | 10 m | Ω |
| Snubber capacitance | $C_2$ | 600μ | F |
| C2 series resistance | $R_s$ | 50 m | Ω |
| Coil inductance | $L_2$ | 50μ | H |

Figure 14:
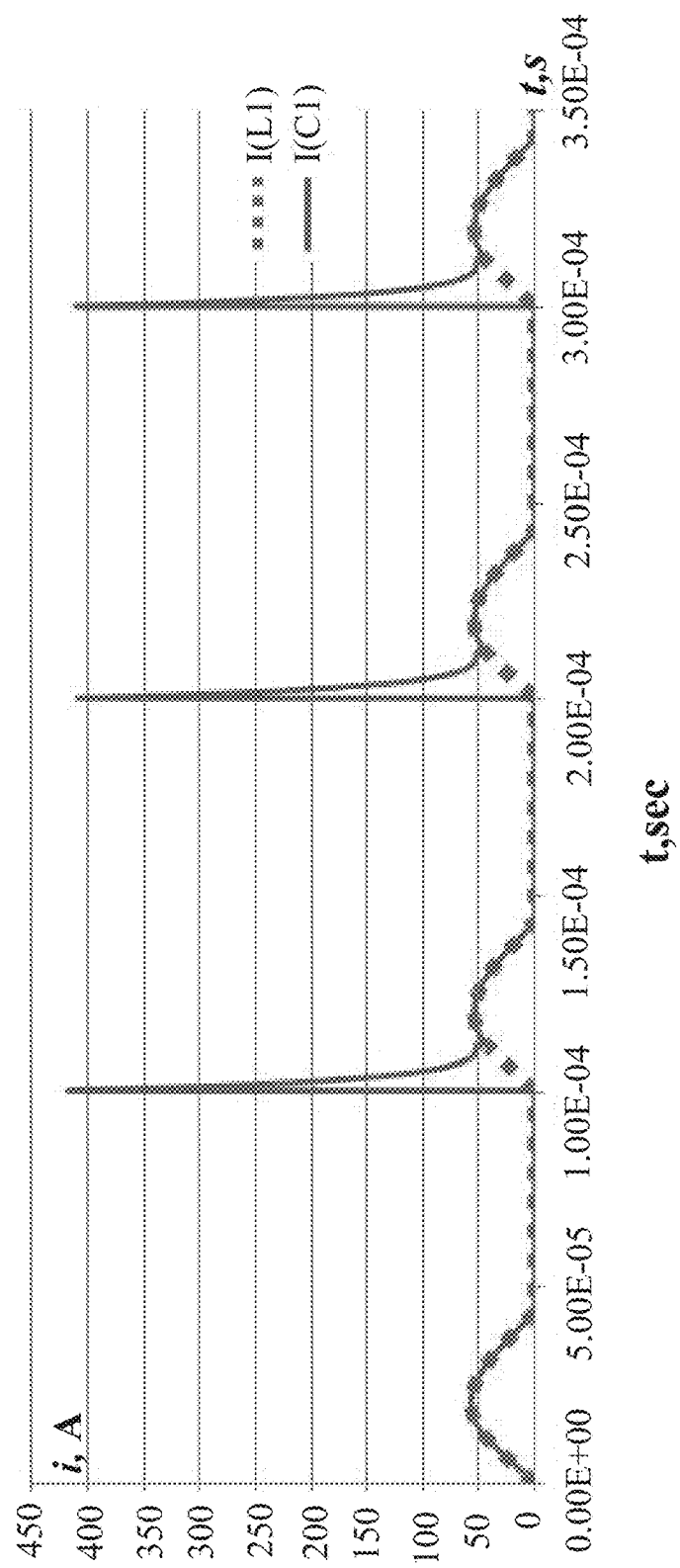
FIG. 14 shows PSpice simulation results during current limiter operation mode.

FIG. 14 presents PSpice simulation results during the "current limiter" operation mode. The dashed line depicts ECB current while the solid line shows UC current. As one can see, battery current (dashed line) is limited. It is less than 100 A (peak) and less than 50 A (average).

In order to experimentally verify feasibility of the proposed device, a prototype of compact power device for emergency starting of ICEs was built. The prototype weighs 17-18 kg., including cables, and has approximate dimensions of 40*30*18 cm.

The device includes power circuitry supporting "current limiter" and "current-source" operation modes, 8-bit RISC (PIC) microcontroller and a 16-bit A/D inverter for measuring the voltages. The prototype power source device was built as a rectangular aluminum suitcase for easy carrying. Cables with massive alligator clamps were located inside the suitcase. The control panel was equipped with labels of cables polarity and LCD indicator. In addition, sound alarm, red light LED indicating the wrong polarity of clamps connection and green light LED demonstrating UC readiness to start the engine were realized.

Figure 15:
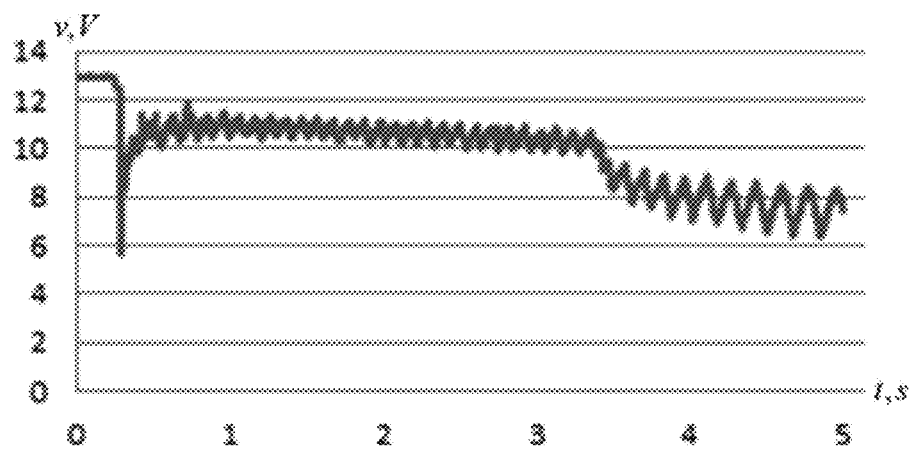
FIG. 15 shows prototype battery voltage during engine cranking.

Prior to prototype verification, a battery-based engine start was attempted. The result is shown in FIG. 15. The battery voltage reflects the sequence of crank movement processes, in which compression is followed by expansion, exhaust and finally intake. Battery internal resistance causes voltage drops when starter current increases within compression and intake and vice versa during expansion and exhaust cycles. As mentioned, the starting process may be successful only if the battery resistance remains relatively low and the resulting voltage drop does not cause sufficient diminishing of crank velocity.

Figure 16:
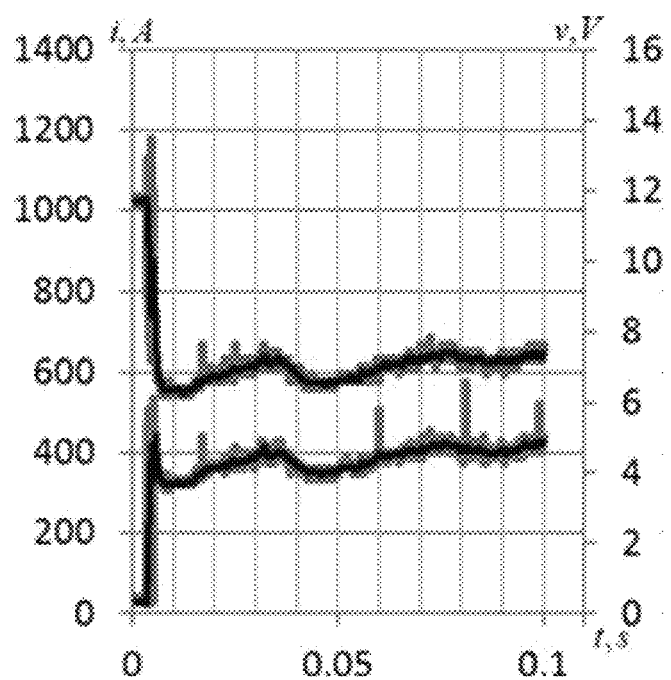
FIG. 16 shows prototype battery voltage and current during a failed start attempt.

An unsuccessful starting attempt is shown in FIG. 16. Weak battery voltage drop does not allow the cranking motor to develop angular speed required for proper starting. In the case of high battery internal resistance that occurs when the battery is weak or discharged, the proposed device may support the battery by increasing the current of the starter.

Figure 17:
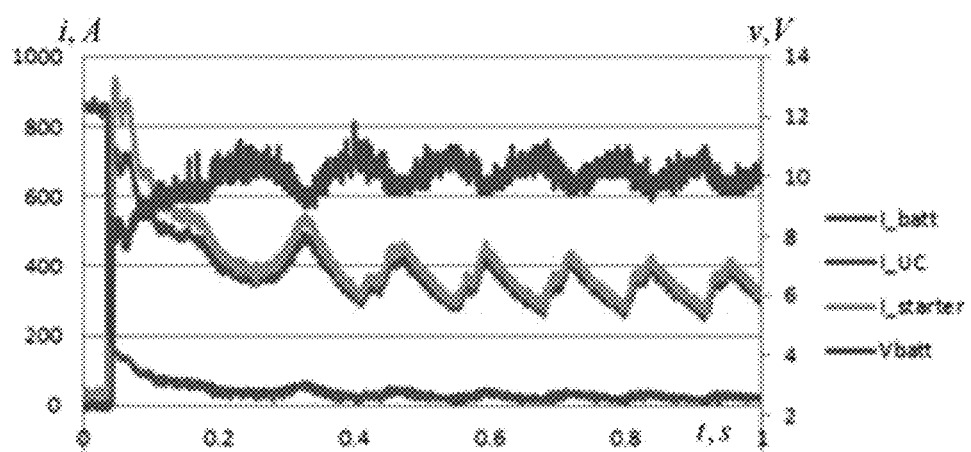
FIG. 17 shows experimental waveforms of battery voltage and current, UC current, and starter current during successful diesel engine starting using the prototype.

The results of successful engine starting when the UC power source prototype is connected to the weak vehicle battery are shown in FIG. 17. A brief analysis of successful starting results indicates that the proposed concept represents an efficient solution. The starting current consists mainly from the UC current even though the ECB is connected as well. It is important to emphasize that the current pushed by the UC into the battery is negligible in even though UC voltage is higher than ECB voltage in the beginning of starting process.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. An ultracapacitor-based power source, for backup starting of a starter powered by a starter battery, comprising:
    an ultracapacitor (UC);
    a charger associated with said UC, configured to charge said UC from an energy source;
    a first and second output connection, configured to connect to said starter in parallel with said starter battery;
    a power source controller associated with said UC, configured to connect said UC to said outputs so as to direct current flow from said UC to said starter, thereby starting said starter from said UC;
    a first switch electrically connected between said UC and said first output, said first switch being controlled by said power source controller, wherein said power source controller directs and prevents current flow from said UC to said outputs by controlling a state of said first switch; and
    a second switch electrically connected between said UC and said second output, said second switch being controlled by said power source controller, wherein said power source controller directs and prevents current flow from said UC to said outputs by controlling a state of said second switch in conjunction with said first switch.

2. A UC-based power source according to claim 1, further comprising a battery voltage sensor configured to measure said voltage level across said starter battery.

3. A UC-based power source according to claim 2, further comprising a UC voltage sensor configured to measure a voltage level across said UC.

4. A UC-based power source according to claim 1, wherein said charger comprises a buck-boost converter.

5. A UC-based power source according to claim 4, wherein said energy source comprises said starter battery.

6. A UC-based power source according to claim 1, wherein said energy source comprises an alternating current (AC) energy source and said charger comprises an AC to direct current (DC) converter.

7. A UC-based power source according to claim 1, wherein said energy source comprises a DC energy source and said charger comprises a DC to DC converter.

8. A UC-based power source according to claim 1, wherein said power source is portable.

9. A UC-based power source according to claim 1, wherein said power source controller is configured to monitor a voltage level of said starter battery and to detect a failure of said starter battery to start said starter by identifying a drop in battery voltage in the absence of a current burst required for starting said starter.

10. Original) A UC-based power source according to claim 9, wherein said power source controller is configured to automatically connect said UC to said outputs when said failure is detected.

11. A UC-based power source according to claim 1, wherein said power source controller is configured to connect said UC to said outputs in response to a trigger signal.

12. A method of starting a starter with a UC-based power source, wherein said starter is powered by a starter battery, said UC-based power source comprising:
  i) an ultracapacitor (UC);
  ii) a charger associated with said UC, configured to charge said UC from an energy source;
  iii) a first and second output connection, configured to connect to said starter in parallel with said starter battery; and
  iv) at least one switch configured to connect and disconnect said UC and said outputs so as to control current flow from said UC to said starter, wherein said energy source comprises a DC energy source and said charger comprises a DC to DC converter, and said charger selectably operates in current limiter and current driver modes, said method comprising:
  charging said UC, from said energy source, to a level required for providing a current burst sufficient to start said starter;
  starting said starter from said UC by directing current flow from said UC to said starter;
  determining respective voltages of said DC energy source and said UC; and
  selecting an operating mode for said charger by:
    i) when a ratio of said UC voltage to said DC energy source voltage is lower than a first specified value, charging said UC in current limiter mode;
    ii) when said ratio of said UC voltage to said battery voltage is between said first specified value and a second specified value, charging said UC in current driver mode, wherein said second specified value is greater than said first specified value; and
    iii) when said ratio of said UC voltage to said battery voltage is greater than said second specified value, operating in standby mode.

13. A method according to claim 12, wherein said energy source comprises an alternating current (AC) energy source and said charger comprises an AC to direct current (DC) converter.

14. A method according to claim 12, wherein said energy source comprises said starter battery.

15. A method according to claim 12, wherein said first specified value is less than one and said second specified value is greater than one.

16. A method according to claim 12, wherein said directing current flow comprises closing said at least one switch between said ultracapacitor and an output connection.

17. A method according to claim 12, further comprising detecting a failure of said starter battery to start said starter and automatically directing said current flow from said UC to said starter.

18. A method according to claim 17, wherein said detecting a failure comprises identifying a drop in battery voltage in the absence of a current burst required for starting said starter.

19. A method according to claim 12, wherein said directing current flow from said UC to said starter is triggered by an external trigger signal.

20. A method of starting a starter with a UC-based power source, wherein said starter is powered by a starter battery, said UC-based power source comprising:
  i) an ultracapacitor (UC);
  ii) a charger associated with said UC, configured to charge said UC from an energy source;
  iii) a first and second output connection, configured to connect to said starter in parallel with said starter battery; and
  iv) at least one switch configured to connect and disconnect said UC and said outputs so as to control current flow from said UC to said starter, said method comprising:
  charging said UC, from said energy source, to a level required for providing a current burst sufficient to start said starter;
  starting said starter from said UC by directing current flow from said UC to said starter; and
  running a testing pulse sequence to update said battery and UC voltages, and selecting said charging mode in accordance with said updated battery and UC voltages.

21. An ultracapacitor-based power source, for backup starting of a starter powered by a starter battery, comprising:
  an ultracapacitor (UC);
  a charger associated with said UC, configured to charge said UC from an energy source;
  a first and second output connection, configured to connect to said starter in parallel with said starter battery; and
  a power source controller associated with said UC, configured to connect said UC to said outputs so as to direct current flow from said UC to said starter, thereby starting said starter from said UC wherein said controller is further configured to alternate UC charging mode between current limiter mode and current source mode in accordance with voltage levels of said starter battery and said UC.

22. An ultracapacitor-based power source, for backup starting of a starter powered by a starter battery, comprising:
  an ultracapacitor (UC);

a charger associated with said UC, configured to charge said UC from an energy source;

a first and second output connection, configured to connect to said starter in parallel with said starter battery; and a power source controller associated with said UC, configured to connect said UC to said outputs so as to direct current flow from said UC to said starter, thereby starting said starter from said UC, wherein said controller is configured to delay said connecting by a time period selected to maximize a reliability of said starting by said UC.

23. An ultracapacitor-based power source, for backup starting of a starter powered by a starter battery, comprising:
an ultracapacitor (UC);
a charger associated with said UC, configured to charge said UC from an energy source;
a first and second output connection, configured to connect to said starter in parallel with said starter battery;
a power source controller associated with said UC, configured to connect said UC to said outputs so as to direct current flow from said UC to said starter, thereby starting said starter from said UC; and a cable for electrically connecting one of said output connections to a terminal of said starter battery, said cable comprising a battery clamp having jaws for attaching to said battery terminal, wherein conductive portions on the interiors of said jaws are electrically connected when said clamp is attached to said terminal and are electrically disconnected when said clamp is detached from said terminal.

24. A UC-based power source according to claim 23, wherein an exterior of said clamp is electrically insulated.

25. A method of starting a starter with a UC-based power source, wherein said starter is powered by a starter battery, said UC-based power source comprising:
   i) an ultracapacitor (UC);
   ii) a charger associated with said UC, configured to charge said UC from an energy source;
   iii) a first and second output connection, configured to connect to said starter in parallel with said starter battery; and
   iv) at least one switch configured to connect and disconnect said UC and said outputs so as to control current flow from said UC to said starter, said method comprising:
charging said UC, from said energy source, to a level required for providing a current burst sufficient to start said starter;
starting said starter from said UC by directing current flow from said UC to said starter; and
delaying said starting by a time period selected to maximize a reliability of starting said starter from said UC.

* * * * *